United States Patent
McCarthy

(12) 
(10) Patent No.: US 8,807,572 B2
(45) Date of Patent: Aug. 19, 2014

(54) V-PACK SEAL AND METHOD FOR SEALING A SHAFT

(76) Inventor: Lisa McCarthy, Virginia Beach, VA (US)

( * ) Notice: Subject to any disclaimer, the term of this patent is extended or adjusted under 35 U.S.C. 154(b) by 481 days.

(21) Appl. No.: 13/134,977

(22) Filed: Jun. 21, 2011

(65) Prior Publication Data

US 2012/0326395 A1    Dec. 27, 2012

(51) Int. Cl.
| | |
|---|---|
| F16J 15/00 | (2006.01) |
| F16J 15/18 | (2006.01) |
| F16J 15/26 | (2006.01) |
| F16J 15/02 | (2006.01) |
| F16J 15/32 | (2006.01) |
| F16J 15/20 | (2006.01) |

(52) U.S. Cl.
CPC .............. F16J 15/20 (2013.01); F16J 15/3272 (2013.01); F16J 15/188 (2013.01); F16J 15/3236 (2013.01)
USPC ........... 277/547; 277/530; 277/546; 277/548; 277/631

(58) Field of Classification Search
CPC ........... F16J 15/18; F16J 15/188; F16J 15/26; F16J 15/3232; F16J 15/3236; F16J 15/3272
USPC ........ 277/496, 499, 519, 543, 631, 497, 498, 277/529, 530, 546–548
See application file for complete search history.

(56) References Cited

U.S. PATENT DOCUMENTS

| | | | | |
|---|---|---|---|---|
| 1,359,170 | A * | 11/1920 | Hatfield | 277/562 |
| 2,486,928 | A * | 11/1949 | Cole | 277/547 |
| 3,120,394 | A * | 2/1964 | Gould | 277/530 |
| 3,124,502 | A * | 3/1964 | Radke | 428/66.4 |
| 3,861,691 | A * | 1/1975 | Wheeler | 277/562 |
| 4,533,149 | A * | 8/1985 | Vater et al. | 277/499 |
| 5,131,666 | A * | 7/1992 | Hutchens | 277/523 |
| 5,377,999 | A * | 1/1995 | Gorman | 277/551 |
| 5,577,737 | A * | 11/1996 | Lacy | 277/308 |
| 6,386,548 | B1 * | 5/2002 | Grimanis et al. | 277/584 |
| 6,726,220 | B2 * | 4/2004 | Grimanis et al. | 277/584 |
| 8,540,250 | B2 * | 9/2013 | Sato | 277/371 |
| 2002/0074739 | A1 * | 6/2002 | Mattina et al. | 277/603 |

* cited by examiner

*Primary Examiner* — Kristina Fulton
*Assistant Examiner* — Nicholas L Foster
(74) *Attorney, Agent, or Firm* — Bradley D. Goldizen

(57) ABSTRACT

An improved shaft seal includes a plurality of V-pack rings that each includes a bi-directional cut with cuts of unequal lengths. An upper cut extends from the top of the V-pack ring to the shoulder. A lower cut extends from the bottom of the V-pack to the shoulder and is longer in length than the upper cut.

5 Claims, 4 Drawing Sheets

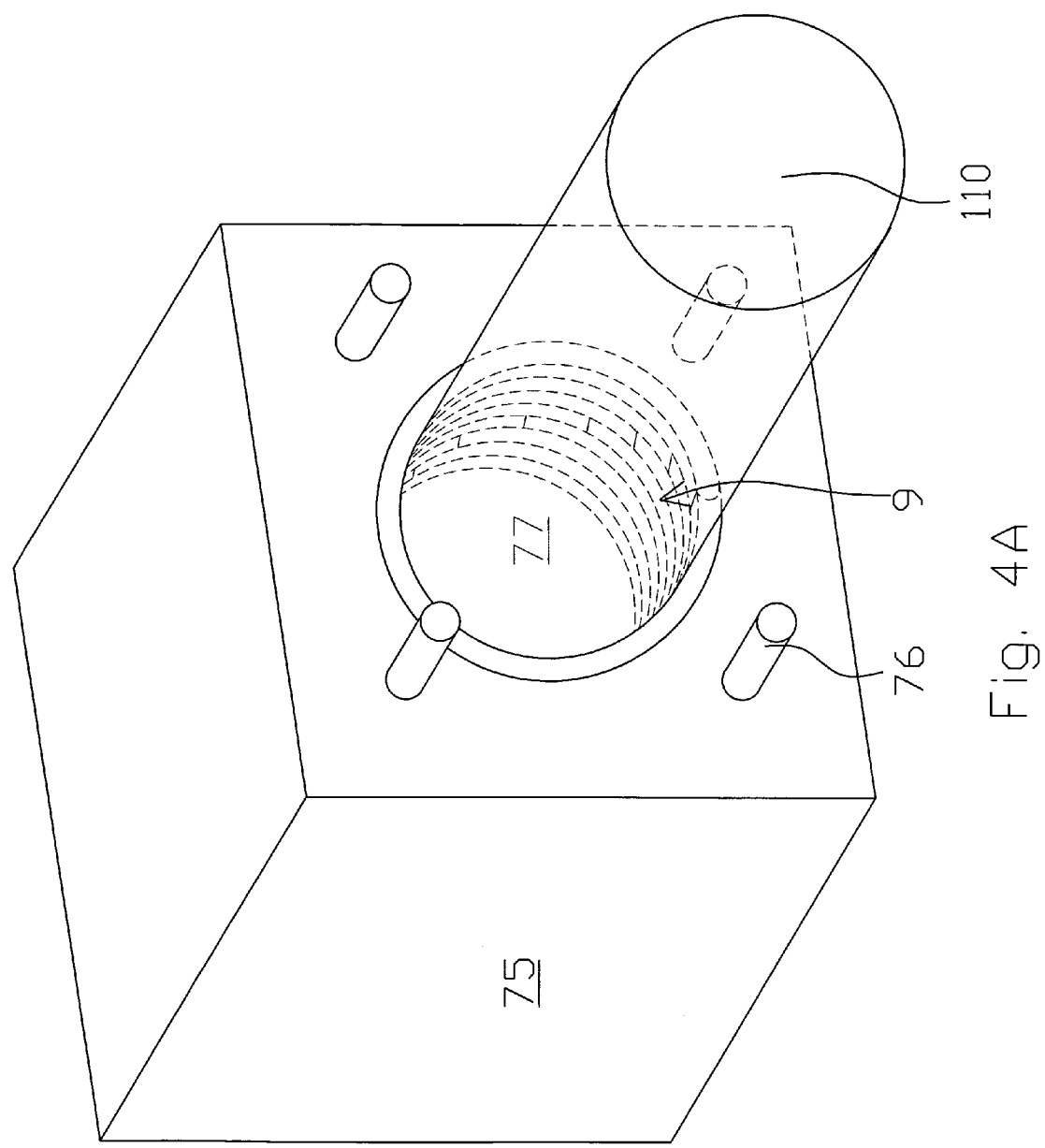

V-PACK SEAL AND METHOD FOR SEALING A SHAFT

There are no related patent applications.
The present application was not subject to federal research and/or development funding.

TECHNICAL FIELD

Generally, the present invention relates to an improved split collar seal which encompasses a shaft to create a liquid tight seal along a region of the shaft, as well as a process for creating a more reliable seal than currently exists. More specifically, the invention is a V-pack seal including a novel type of an uneven bi-directional cut that extends from a top to a bottom of the seal and which assures a more reliable seal by preventing the cut ends of the V-pack seal from overlapping one another during an installation process that seats the V-pack seal around the shaft.

BACKGROUND OF THE INVENTION

Packing material has been utilized for creating liquid tight seals on shafts in submarines including stern planes and rudder rams, as well as other military and industrial applications. Typically, the V-pack material is provided in rings having an interior opening that is slightly smaller than a cross-section diameter of a shaft onto which the V-packs are seated. Previously, the V-pack is provided in a ring of material having a top, shoulder, and bottom. The bottom of the V-pack forms a concave region. To create a shaft seal, a plurality of V-pack rings are slid onto the shaft and stacked against one another such that the top of each successive ring is seated into the bottom concave region of the previous ring. When a shaft seal needs to be rebuilt without removing the shaft, the rings have previously been cut in a diagonal direction and arranged around the shaft. With a single diagonal cut, it is difficult to create a sound seal as the free ends of the cut material tend to overlap one another and ride up on each other. Such overlapping and riding-up characteristics may cause premature failure of the seal. As multiple rings of V-pack material are stacked against one another to create the seal, overlapping ends can cause pockets of air to be trapped between the layers of V-packing. The expansion of air within the shaft can unseat a shaft seal over time with temperature and pressure changes, especially when diving and surfacing in submarines. Moreover, if the free ends of the V-pack material do not seat properly about the shaft, then a liquid tight seal is not achieved and seawater may migrate from one end of the shaft to the other.

By way of example, there are several publications that are directed towards various types of seals and rings.

U.S. Pat. No. 1,359,170 to A. L. Hatfield discloses a split packing ring. FIG. four of Hatfield shows the ring being split on a diagonal cut. A shaped notched 13 is shown in FIG. 7.
U.S. Pat. No. 1,899,630 to V. E. Nelson discloses an oil retaining packing for rods and shafts. FIG. 3 shows the ring 16 that is split.
U.S. Pat. No. 2,017,615 to V. A. Bary discloses a packing for rotary shafts. The invention includes extensions and complementary recesses which receive the extension as shown in FIGS. 2-4.
U.S. Pat. No. 2,098,992 to J. M. Bandish discloses a packing ring. The packing includes rings 19, 20, and 21 which have diagonal cuts.
U.S. Pat. No. 2,553,750 to P. I. Cole discloses a packing ring. FIGS. 3-4 show packing arranged in opposite directions.
U.S. Pat. No. 2,692,152 to G. R. Tremolada discloses a split packing cartridge. The cartridge has a diagonal cut which is vertical at the bottom as shown in FIGS. 2-3.
U.S. Pat. No. 2,706,665 to C. W. Showalter discloses a packing for rods or shafts. FIGS. 3, 5, 6 show differently shaped cut ends.
U.S. Pat. No. 2,910,332 to T. D. Madsen discloses composed packing rings, particularly in piston rings for internal combustion engines. FIGS. 1-2 shows stepped ends.
U.S. Pat. No. 3,068,017 to R. A. Prosser discloses a high pressure packing adaptor. FIGS. 1-3 appear to show arrow shaped ends on the packing.
U.S. Pat. No. 3,169,776 to M. D. Felt discloses multiple purpose self-loading machinery packing. FIG. 1 shows a diagonal shaped end 17.
U.S. Pat. No. 3,171,661 to H. Blair et al discloses a "V" packing with insert and method of making the same. FIG. three shows a unique cross-section for the "V" packing.
U.S. Pat. No. 3,627,335 to Wheeler discloses a packing member. A packing member comprises an annular body having inner and outer sealing lips extending from one of its ends and from a point near its axial center, respectively. A plurality of holes extends axially into the body from equally spaced points along a circle concentric with the body. The member may be split along a line extending through at least two angles axially of the body, if desired. FIG. 6 shows a second embodiment which appears to have an arrow shaped end.
U.S. Pat. No. 4,818,209 to Petersson et al. discloses a mould and sealing ring. The sealing portion and the reinforcing portion constitute two portions positioned adjacent each other on each side of the connection surface in the axial direction of the ring for dividing the ring into a portion which is inactive from the sealing point of view and is active from the forming and locking point of view and a portion which is active from the sealing point of view is substantially inactive from the forming and locking point of view.
U.S. Pat. No. 3,861,691 to Wheeler discloses a packing member. A packing member comprises an annular body having inner and outer sealing lips extending from it. A plurality of holes extends axially into the body from spaced points along a circle concentric with the body. The member may be split along a line extending through at least two angles axially of the body, if desired.
U.S. Pat. No. 3,955,673 to Fosness discloses a rotary shaft packing replacement kit. A repacking kit for replacement of fluid seals for devices such as pumps is described. The kit comprises a plurality of preformed, oversized circular split rings having a specified configuration. The rings assume a helical shape around the shaft to be sealed and each is cut to size in a single step.
U.S. Pat. No. 4,398,731 to Gorman et al. discloses a Y-interlock packing seal. The seals are stacked on one another such that the yoke portion is nested within the Y recess of a successive seal.
U.S. Pat. No. 4,576,384 to Azibert discloses a split mechanical face seal. The seals have complementary recesses and extensions.
U.S. Pat. No. 4,643,440 to Massey, Jr. discloses packing with compensating means. The compensating ring includes a tapered annular protrusion having wedge faces for contacting and urging the shaft sealing lip toward the shaft and contacting and urging the stuffing box sealing lip towards the stuffing box when an axially-directed force is applied to the packing. The compensator ring is adjustable in diametrical dimensions so that contact is maintained between the wedge faces and the sealing lips and an effective seal is provided even if wear occurs on the sealing ring adjacent to the movable shaft.

U.S. Pat. No. 5,377,999 to Gorman discloses a guilded split packing ring comprising a split in the circumference of the annular body defining a nose at one end and a cavity at the other end for matingly receiving the nose therein.

U.S. Pat. No. 5,695,201 to Wheeler discloses a packing member with reducing friction. FIGS. 6-7 show an embodiment of the Wheeler invention having a rounded end.

U.S. Pat. No. 6,116,573 to Cornette et al. discloses a packing system for valves. FIG. 6 appears to have angled ends which mate together.

U.S. Pat. No. 7,140,618 to Valls, Jr. discloses a socket with dual-functional composite gasket. FIGS. 4-8 show different extension and complementary recesses.

U.S. Pat. No. 7,303,179 to Bush et al. discloses a split packing follower for use with valves. The first and second members include complementary interlocking structures that are configured to mechanically couple the first and second members to form the packing follower.

U.S. Pat. No. 7,708,283 to Azibert et al. discloses a mechanical seal assembly. The seal assembly has mating segments with overlapping surfaces.

U.S. Publication No. 2010/0206162 to Blue discloses a ram bearing assembly seal assembly therefore and associated method. The split seal joins in an interface which appears to include angle cuts.

U.S. Publication No. 2010/0264597 to Sato et al. discloses a split mechanical seal. FIGS. 12A-C appears to show angled cuts forming an arrow which are inserted into an arrow shaped recess.

None of the aforementioned documents contemplates, singly or in any combination, an improved V-pack seal comprising a plurality of V-pack rings that are sliced in a unique bi-directional manner to create a superior seal with the ends of each V-pack ring being seated into a proper relationship to encircle the shaft without creating any air pockets.

SUMMARY OF THE INVENTION

An improved V-pack ring is provided with a novel cut which allows the V-pack ring to be properly re-sealed. This resolves the "ride up" problem and overlapping ends experienced by current installers of V-pack rings. In the instant case, a V-pack ring is sliced in opposite directions from the top and bottom such that the cuts intersect at substantially ninety degrees to one another, with one cut being longer than the other. In a preferred embodiment, the top of the V-pack ring is sliced at substantially forty-five degrees with respect to the top and extends to substantially the shoulder of the V-pack ring. A second cut is sliced at substantially forty-five degrees to the bottom of the V-pack ring. The second cut is preferably longer in length that the first and extends in an opposite direction to the first cut.

In a preferred embodiment, the shorter cut is created along a diagonal line stretching from the top of the V-pack to the shoulder region of the V-pack ring. The longer cut is created on a diagonal line stretching from the bottom of the V-pack ring to intersect the shorter line at substantially the shoulder region of the V-pack ring.

It is an object of the invention to provide an improved V-pack ring that comprises a bi-directional cut that assists the free ends of the cut V-pack ring to be properly seated about a shaft during an installation process that creates a V-pack seal.

It is another object of the invention to provide a superior seal to existing V-pack seals, as well as a superior method of creating a V-pack seal by first cutting a V-pack ring in a bi-directional manner as disclosed herein.

Additional objects and advantages of the invention will be set forth in part in the description which follows, and in part will be obvious from the description, or may be learned from practicing the invention. The objects and advantages of the invention will be obtained by means of instrumentalities in combinations particularly pointed out in the appended claims.

BRIEF DESCRIPTION OF THE DRAWINGS

FIG. 4A is a perspective view showing a V-pack seal in place on a shaft.

DETAILED DESCRIPTION OF THE INVENTION

Figure 1A:
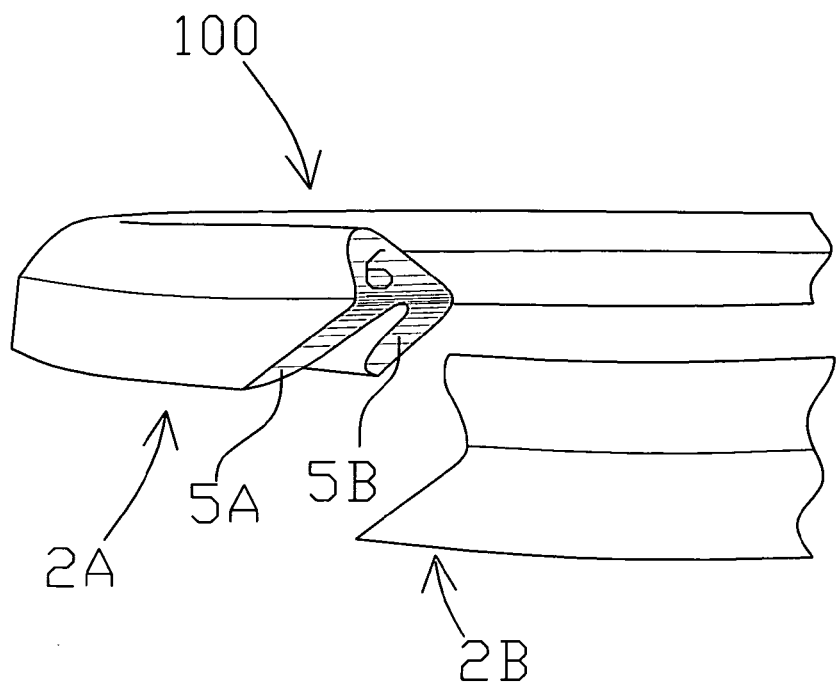
FIG. 1A is an external perspective side view of the V-pack with bi-directional cut showing a first free end of the V-pack ring.
Figure 1B:
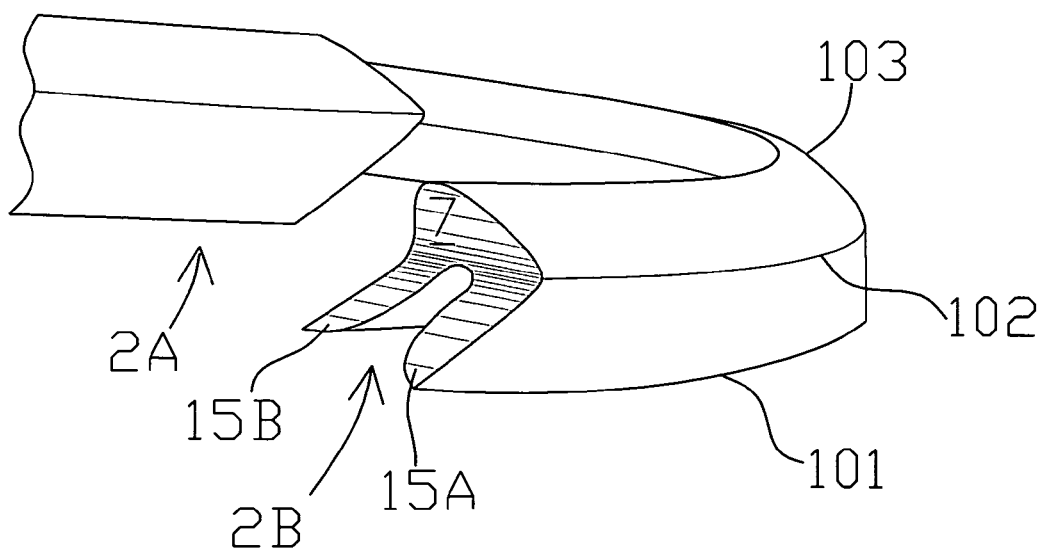
FIG. 1B is an external perspective side view of the V-pack ring of FIG. 1A and showing a second free end of the V-pack ring.

The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

Figure 2:
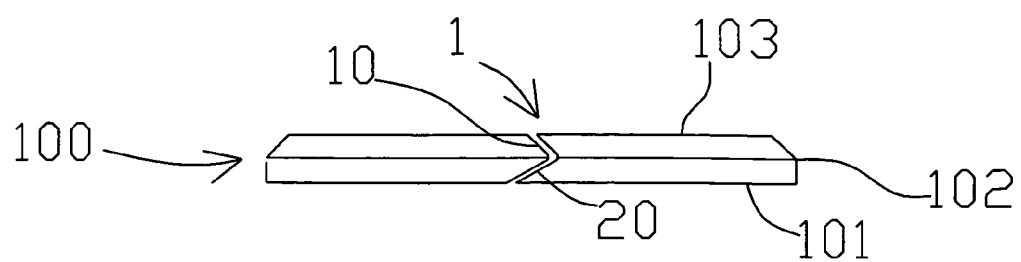
FIG. 2 is a side view of the V-pack shown in FIG. 1.

FIG. 2 shows a bi-directional cut 1 that comprises a first cut 10 extending in a first diagonal direction and being arranged in an upper portion of the V-pack ring 1. The first cut 10 extends from a top 103 of the V-pack ring to the shoulder 102. A second cut 20 is formed between the bottom 101 and the shoulder 102 and extends in a second diagonal direction that is opposite that of the first cut 10 to intersect the first cut 10 at substantially the shoulder 103. The second cut 20 is longer than the first cut 10 to create a first end 2A. The first end 2A is substantially an offset arrow-shaped end which mates within the second end 2B which forms a complementary recess. In this manner, the first end 2A securely seats within the second end 2B when a shaft seal 9 is created.

FIG. 1A shows the first free end 2A of the V-pack ring and includes an upper region having a rounded top 6 and two legs 5A, 5B that form a complementary recess 35 for receiving the top of a successive V-pack ring. As can be recognized, the length of the cut of the rounded top region is shorter than the length of the cut of along the legs. When the V-pack ring is seated around a shaft, the second free end 2B of the V-pack ring includes a rounded top 7 and two legs 15A, 15B which form an overall complementary shape that mate with the first free end 2A. Having a bi-directional cut extending from the top to the bottom of the V-pack ring ensures that the V-pack ring will be securely seated without having overlapping edges and solves a heartfelt need that has plagued shaft seals installed on submarines and the like for many years.

Figure 4B:
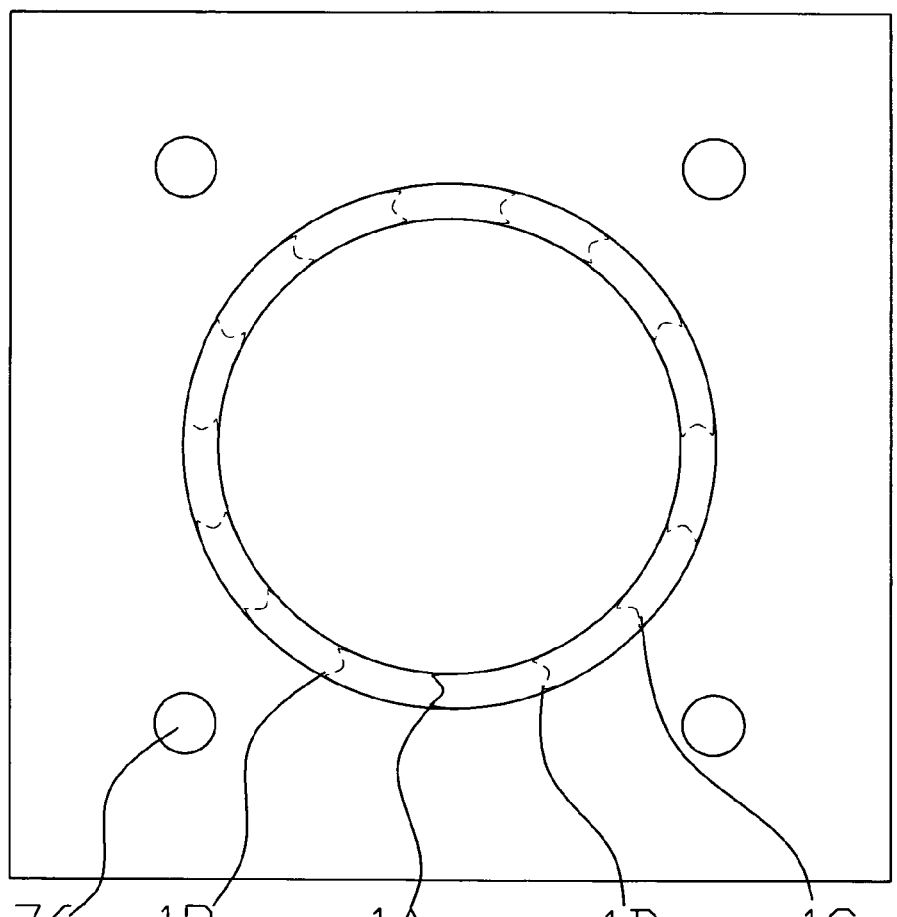
FIG. 4B is an end view of the V-pack seal shown in FIG. 4A and with each successive cut shown in phantom and with a minimum of fifteen radial degrees between it and its predecessor.
Figure 3A:
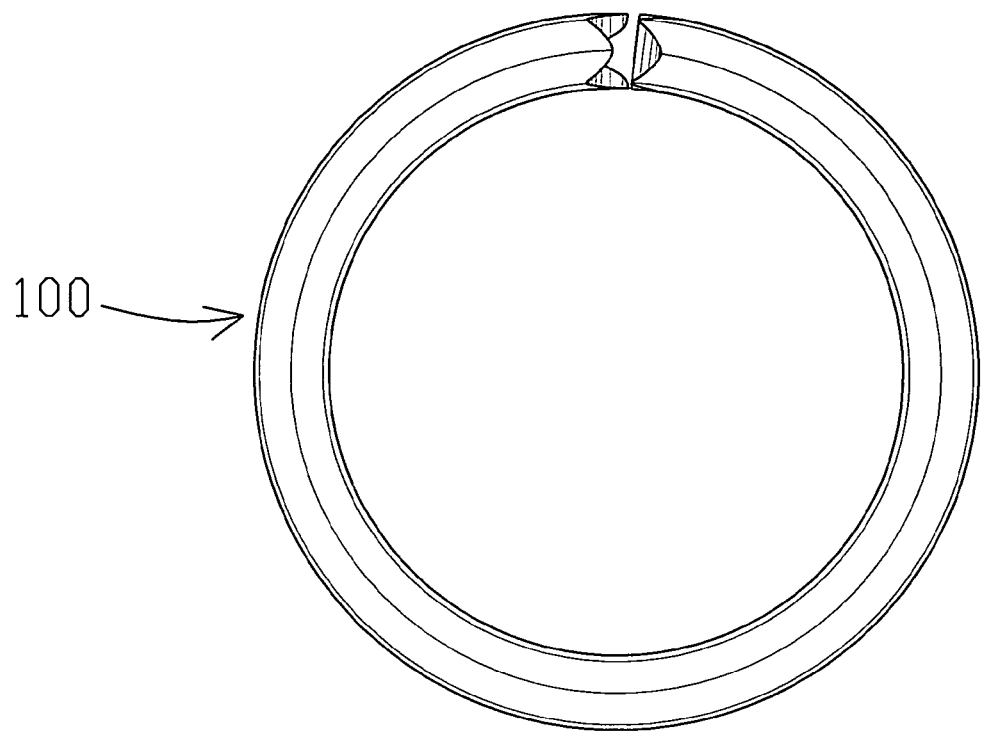
FIG. 3A is a top view of the V-pack shown in FIG. 1.
Figure 3B:
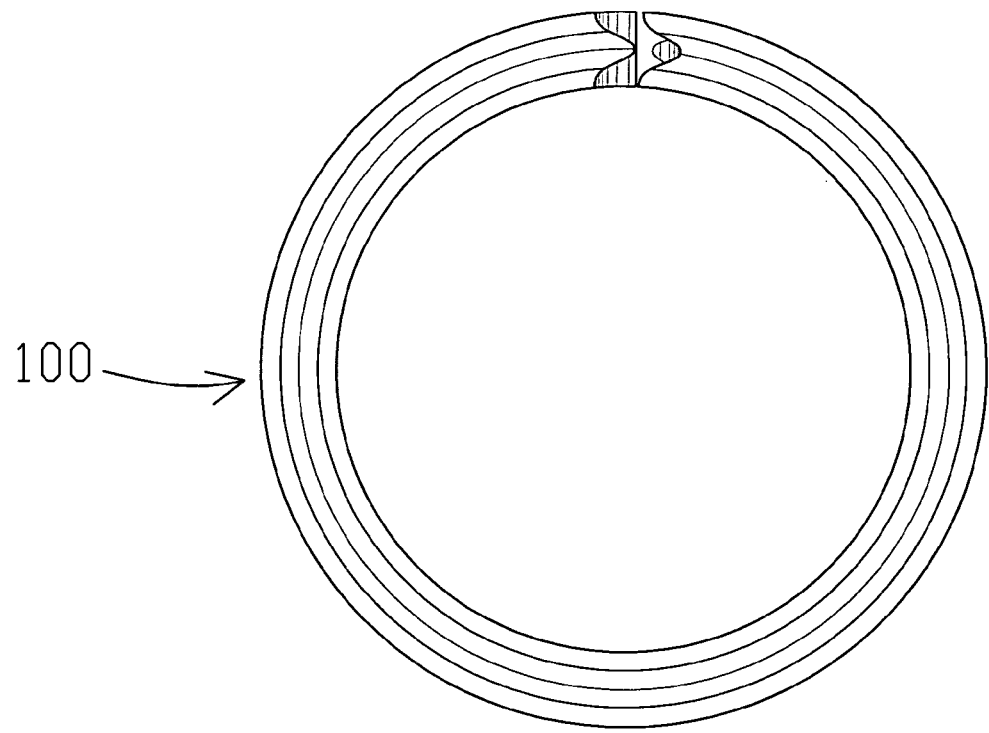
FIG. 3B is a bottom view of the V-pack shown in FIG. 1.

FIGS. 3A and 3B are top and bottom perspective views of the V-pack ring and showing the features discussed above. As can be understood by the skilled artisan when viewing these drawings in conjunction with FIGS. 4A, 4B, a superior seal can be created by stacking V-pack rings along a shaft and rotating the unique cut of each successive V-pack ring fifteen degrees further around the outer diameter of the shaft with respect to the previous V-pack ring. That is, the installer may arrange the first cut of the first V-pack ring at substantially top dead center of shaft. The second V-pack ring is then rotated at least fifteen degrees in the clockwise or counterclockwise direction. Each successive V-pack ring is continued to be rotated at least fifteen degrees from its predecessor until an adequate number of V-pack rings are stacked to create a liquid tight seal about the shaft. FIG. 4A depicts a box 75 having a recess 77 into which the V-pack seal 9 is created about a shaft 110. The broken lines denote the bi-directional cuts of each successive V-pack ring and include cuts 1B-1P. As shown in FIG. 4B, a plurality of V-pack rings is stacked along a length of the shaft 100 within the recess 77 of box 75. Threaded studs 76 extend from an end of the box 75 to receive a flange (not shown) that maintains the V-pack seal 9 within the recess 77. The cuts 1A-1P are arranged radially about the shaft 100 with a minimum of 15 degrees of difference between each successive V-pack ring.

Figure 5:
FIG. 5 is a side view of a prior art V-pack having a diagonal cut.

FIG. 5 depicts a prior art V-pack ring 100 that has been cut in a diagonal direction. As can be understood by the skilled artisan when viewing this figure, the free ends 101, 102 may overlap causing air pockets within a seal created by stacking a plurality of V-pack rings along a shaft. The air pockets are detrimental to the overall integrity of the seal and may cause water to leak along the shaft when at depths.

It is to be understood that the invention is not limited to the exact construction illustrated and described above, but that various changes and modifications may be made without departing from the spirit and the scope of the invention as defined in the following claims. While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

I claim:

1. A V-pack ring that forms a portion of a V-pack seal about a shaft, said V-pack ring being completely split by a bi-directional cut defining a first and a second free end of the V-pack ring, said bidirectional cut consisting of a first planar cut that extends from a top of the V-pack ring to a shoulder of the V-pack ring and a second planar cut that extends from the shoulder to a bottom of the V-pack ring, wherein one of the free ends has a convex shape of an offset arrowhead and the other free end has a concave shape that accepts the free end with the convex shape when installed onto a shaft to create a seal, said bi-directional cut having no portion that is vertical to a main axis of the V-pack ring and wherein said offset arrowhead is defined by one of the first and second cuts being substantially longer than the other.

2. The V-pack ring of claim 1 wherein said second cut is longer than the first cut.

3. A V-pack seal comprising a plurality of V-pack rings each V-pack ring having a top, a bottom, and a shoulder arranged substantially between the top and bottom, each V-pack ring being completely split by a bi-directional cut defining a first and a second free end of the V-pack ring, said bidirectional cut consisting of an upper planar section that extends from the top of the V-pack ring to the shoulder and a lower planar section that extends from the shoulder to the bottom of the V-pack ring, wherein one of the free ends has a convex shape of an offset arrowhead and the other free end has a concave shape with a complementary arrowhead shape that accepts the free end with the convex shape when installed onto a shaft to create a seal, said bi-directional cut having no portion that is vertical to a main axis of the V-pack ring and wherein said offset arrowhead is defined by one of the first and second cuts being substantially longer than the other.

4. The V-pack seal of claim 3 wherein each successive V-pack ring is arranged with at least fifteen degrees between its cut and the cut of a previous V-pack ring.

5. A method of creating a seal comprising a plurality of V-pack rings including:
   providing a plurality of V-pack rings, each V-pack ring being completely split by a bi-directional cut defining a first and a second free end of the V-pack ring, said bidirectional cut consisting of an upper planar section that extends from a top of the V-pack to a shoulder of the V-pack seal and a lower planar section that extends from the shoulder to a bottom of the V-pack, wherein one of the free ends has a convex shape of a substantially offset arrowhead and the other free end has a concave shape that accepts the free end with the convex shape when installed onto a shaft to create a seal, wherein said bi-directional cut has no portion that is vertical to a main axis of the V-pack ring and wherein said offset arrowhead is defined by one of the first and second cuts being substantially longer than the other, and
   stacking the V-pack rings along a the shaft and seating a top from each successive V-pack ring into a bottom recess of the previous V-pack ring, seating the free end with the convex shape of each V-pack ring within the concave shape of the free end with the concave shape on the same V-pack ring, and aligning the V-pack rings such that at least fifteen degrees of separation are maintained between the bi-directional cut of each successive V-pack ring to create the seal.

* * * * *